Figure 1:
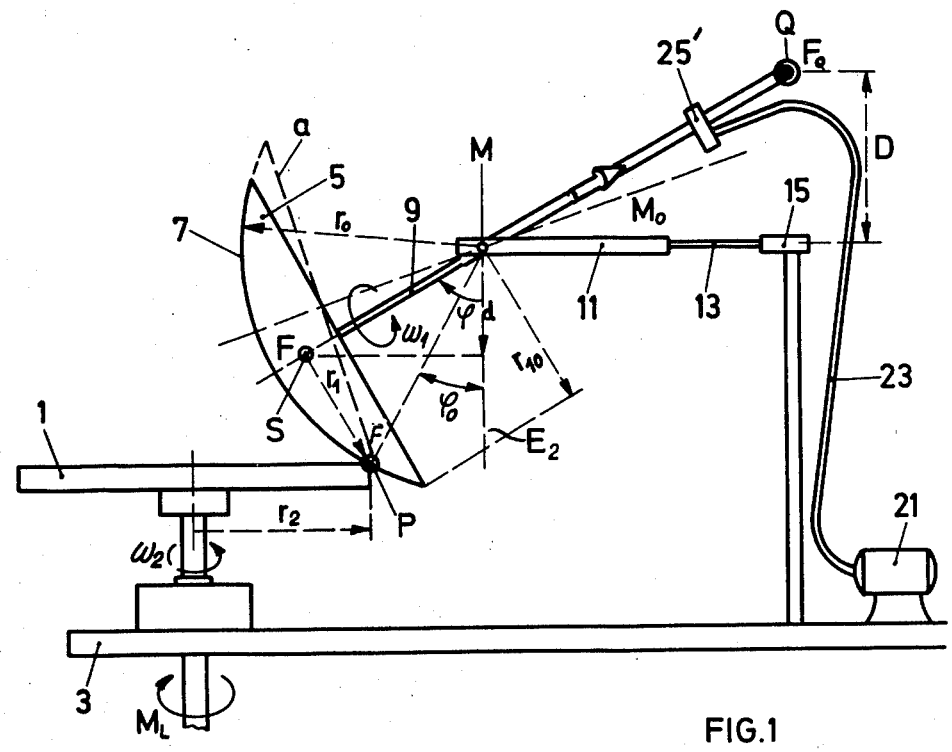

United States Patent [19]

Lampert

[11] 4,210,032
[45] Jul. 1, 1980

[54] TORQUE CONVERTER ESPECIALLY FOR THE USE IN ELECTRO MOBILS

[76] Inventor: Heinz Lampert, Fuchsbühelstrasse 50, CH-9470Buchs, Switzerland

[21] Appl. No.: 919,767

[22] Filed: Jun. 28, 1978

[30] Foreign Application Priority Data

Jun. 29, 1977 [CH] Switzerland .................. 8017/70

[51] Int. Cl.² ............... F16H 15/26; F16H 15/00; F16H 13/00
[52] U.S. Cl. ........................ 74/198; 74/190.5; 74/196; 74/207; 74/208; 74/209
[58] Field of Search ........... 74/198, 194, 196, 190, 74/190.5, 191, 199, 207, 208, 209

[56] References Cited

U.S. PATENT DOCUMENTS

| | | | |
|---|---|---|---|
| 128,773 | 7/1872 | Wright | 74/199 |
| 862,652 | 8/1907 | Parce | 74/207 X |
| 1,193,448 | 8/1916 | Ashton et al. | 74/207 |
| 1,276,601 | 8/1918 | Whiting | 74/190.5 |
| 1,284,969 | 11/1918 | Anderson | 74/194 |
| 1,926,279 | 9/1933 | Gray | 74/198 |
| 2,115,522 | 4/1938 | Gotz | 74/198 |
| 2,737,820 | 4/1956 | Collar | 74/198 |
| 3,270,145 | 8/1966 | Gauban | 74/198 X |
| 3,894,830 | 7/1975 | Edwards | 74/191 X |

FOREIGN PATENT DOCUMENTS

| | | | |
|---|---|---|---|
| 255928 | 2/1962 | Australia | 74/194 |
| 509274 | 8/1920 | Fed. Rep. of Germany | 74/191 |
| 663386 | 8/1929 | France | 74/191 |
| 1303145 | 7/1962 | France | 74/198 |
| 60907 | 4/1948 | Netherlands | 74/191 |
| 42769 | 11/1907 | Switzerland | 74/199 |
| 425460 | 3/1935 | United Kingdom | 74/198 |
| 763514 | 12/1956 | United Kingdom . | |
| 797206 | 6/1958 | United Kingdom | 74/198 |
| 827608 | 2/1960 | United Kingdom . | |

Primary Examiner—Leslie Braun
Attorney, Agent, or Firm—Peter K. Kontler

[57] ABSTRACT

The present invention concerns a torque converter for continuously varying the step down ratio in a power transmission in that this step down ratio being automatically varied to give the necessary driving moment to overcome the momentarily applied loading moment.

58 Claims, 22 Drawing Figures

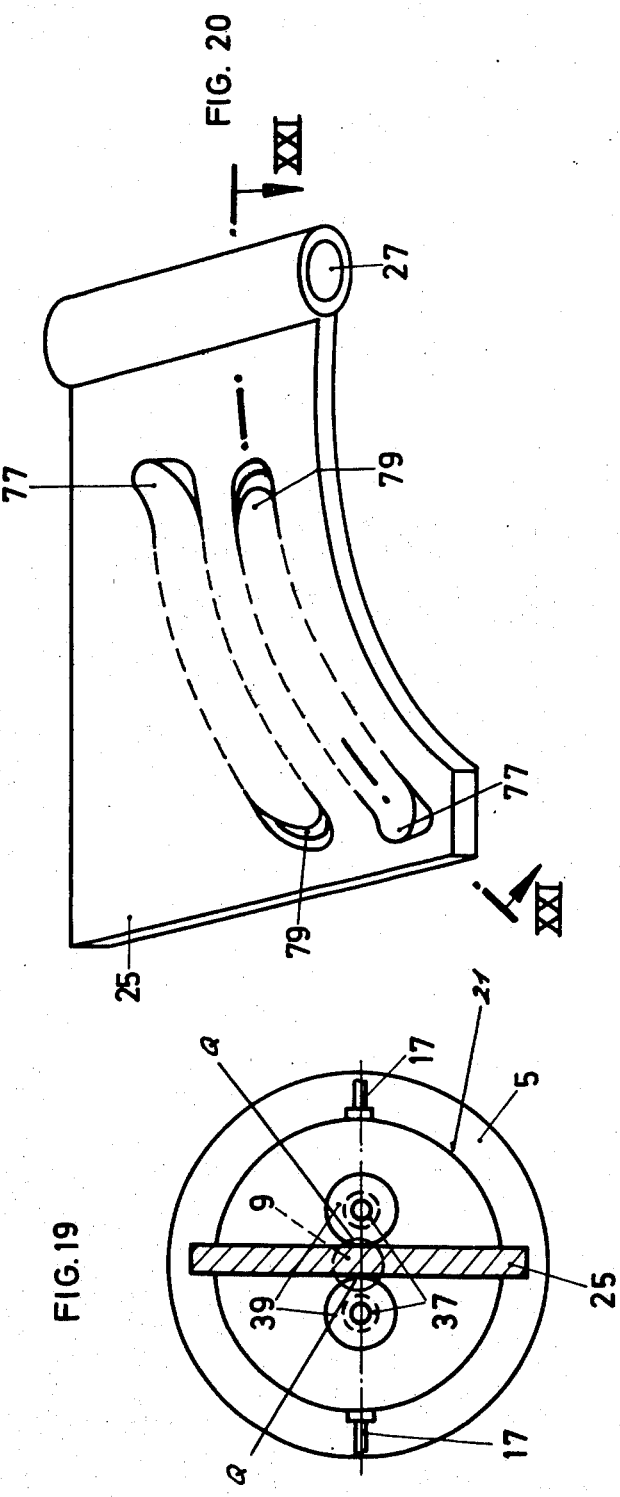

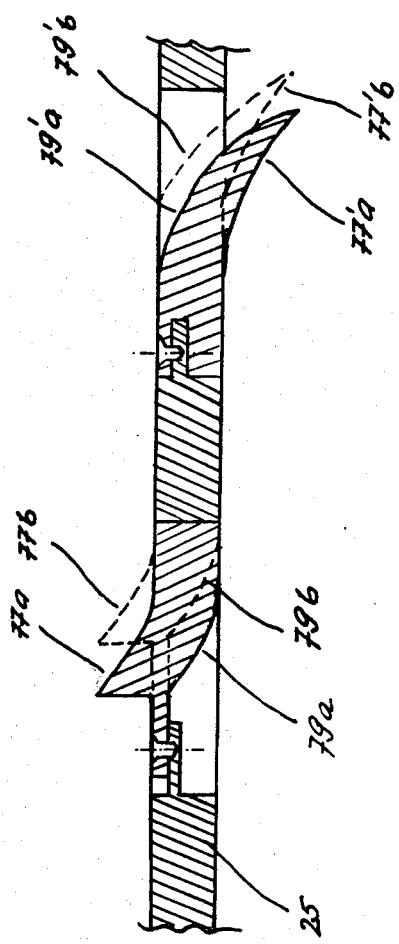

TORQUE CONVERTER ESPECIALLY FOR THE USE IN ELECTRO MOBILS

BACKGROUND OF THE INVENTION

Electro mobils are only economical in a quite narrow loading range if the power transmission is provided with a rigid step down ratio. Although electronic control systems may bring an amelioration of its commerciality the driving power required has to be quite high for overcoming only small slopes. Therefore, gearboxes have to be provided to enable altering the transmission ratio in steps. Hydraulic gears, especially used for transmission of small powers show too small efficiencies. Vario-couplers which work as torque converter are primarly known based on hydrostate technique and are very expensive.

SUMMARY OF THE INVENTION

The present invention provides a torque converter on friction wheel base which regulates automatically without electronics, its step down ratio according to a momentarily applied loading moment which has to be overcome by an appropriate driving moment. According to the invention this purpose is achieved by a torque converter comprising a first and a second friction wheel in contact with each other, the first of it being a ruled surface wheel with axially varying radius, wherein the rotational axis of both wheels are suspended so as to enable

- a rolling movement of the first friction wheel on the second wheel in a plane containing its rotational axis to alter step down ratio between the wheels,
- a tilting movement of said axis relative to each other at least partly in direction of the circumferential speed of the wheels at its friction area, comprising force regulating means providing a force on a first of said wheel's axis, said force being regulated according to a varying friction force on said first axis' wheel to compensate for said friction force, said regulating means comprising force-generating means of spring characteristic to provide momentarily over- or undercompensation of said friction force when altering in time.

The inventive torque converter will now be described by examples based on the following figures:

FIG. 1—A schematic side view of the torque converter for explaining the geometrical and dynamical quantities determining the dynamic converter behaviour.

Figure 2:
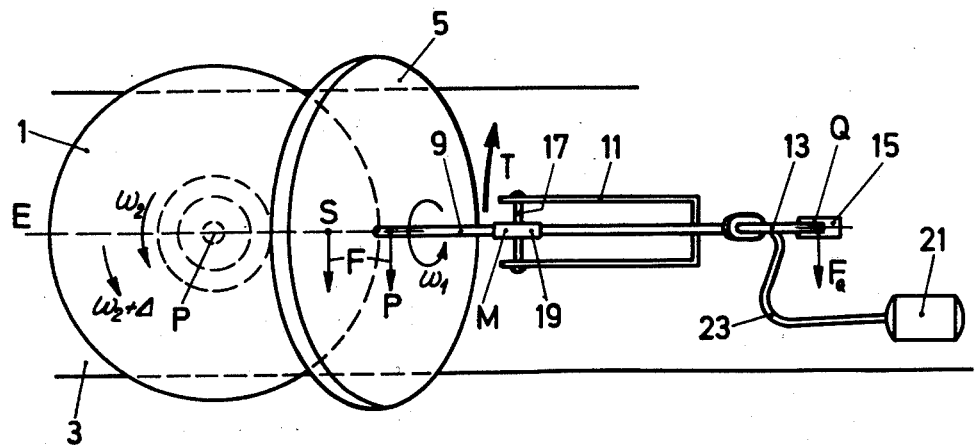

FIG. 2—A top view of the torque converter according to FIG. 1.

Figure 3:
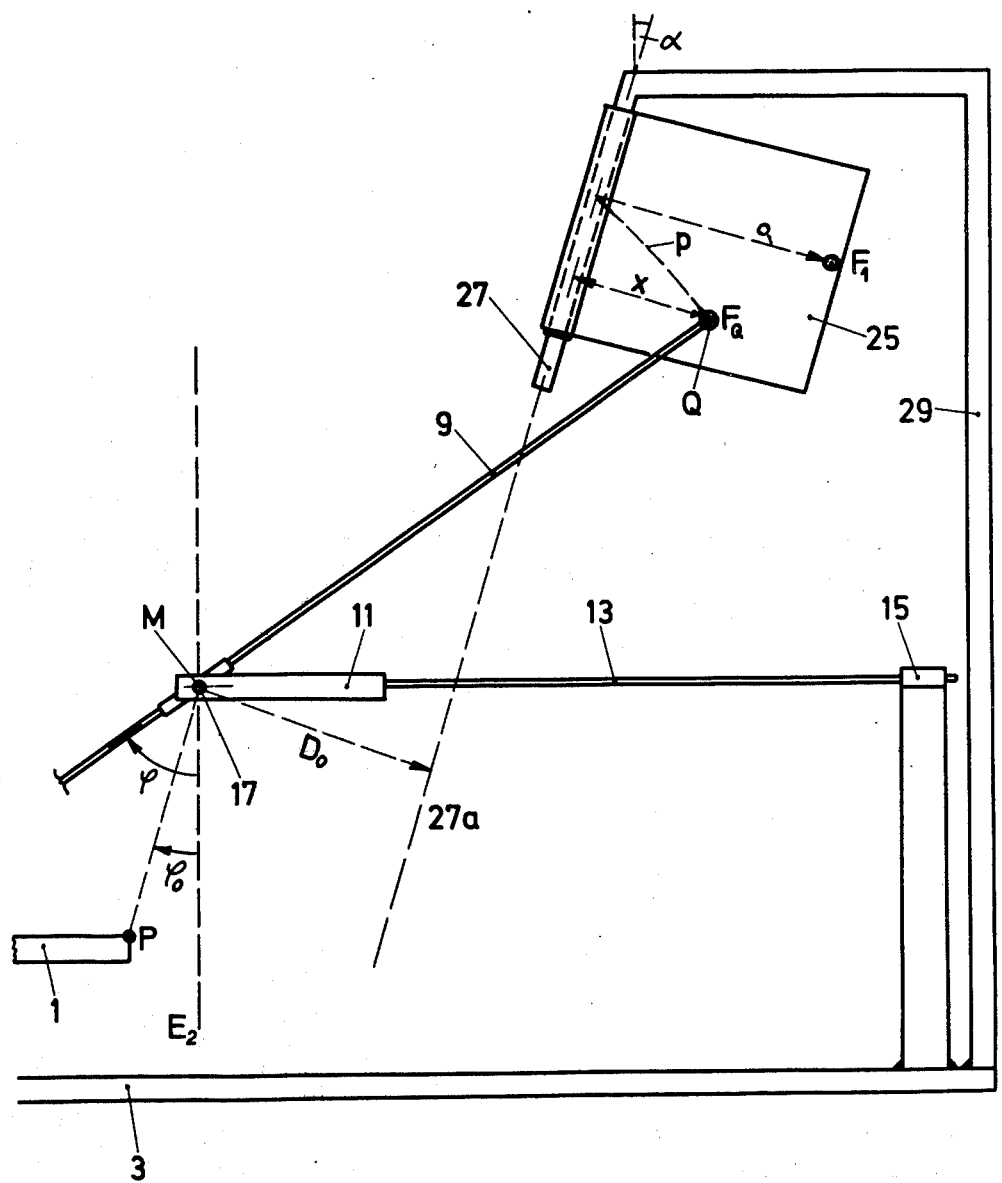

FIG. 3—An enlarged part of the torque converter of FIG. 1 in side view with an additionally introduced force regulator at an unspecific position to determine the general law for its optimum position.

Figure 4:
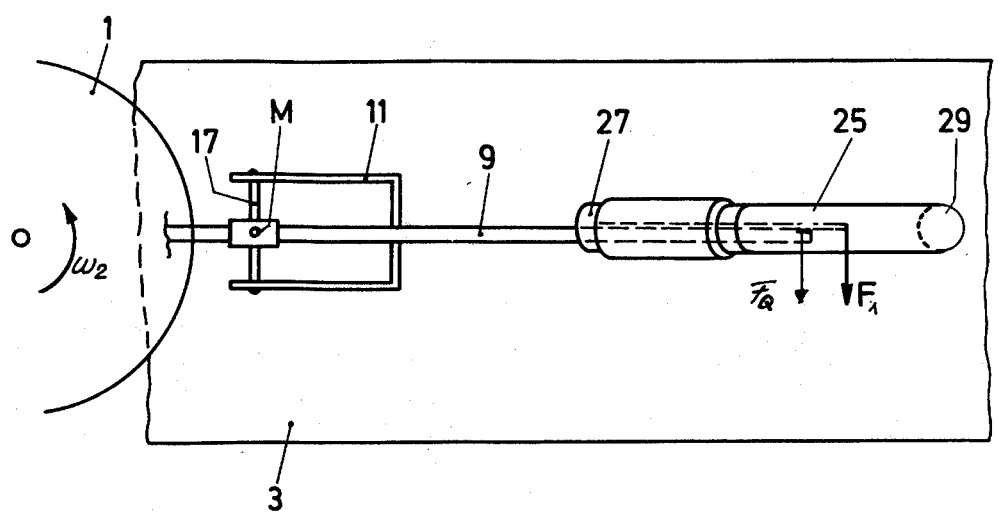

FIG. 4—A top view of the embodiment according to FIG. 3.

Figure 5:
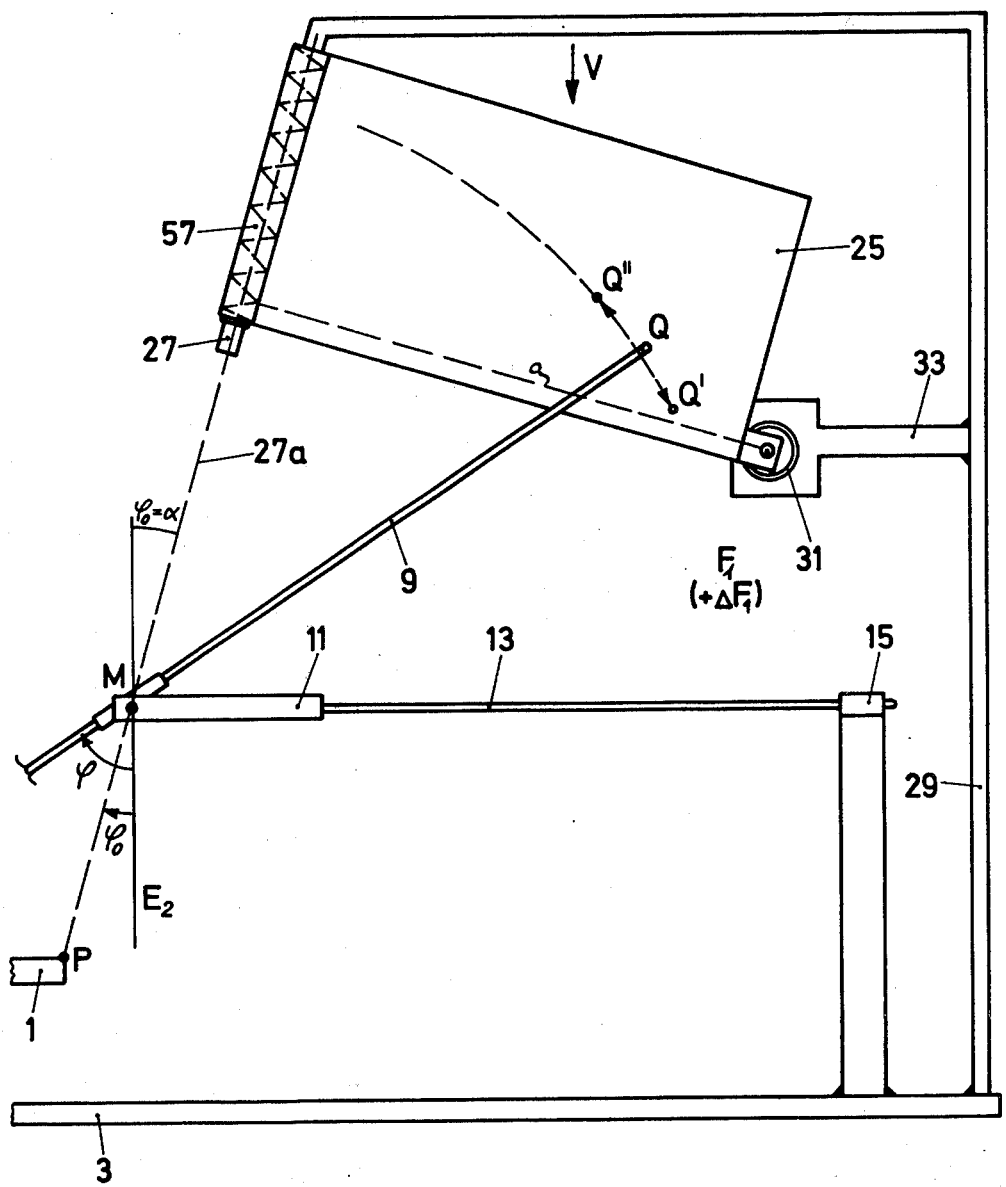

FIG. 5—A side view according to FIG. 3, the force regulator being specifically arranged.

Figure 6:
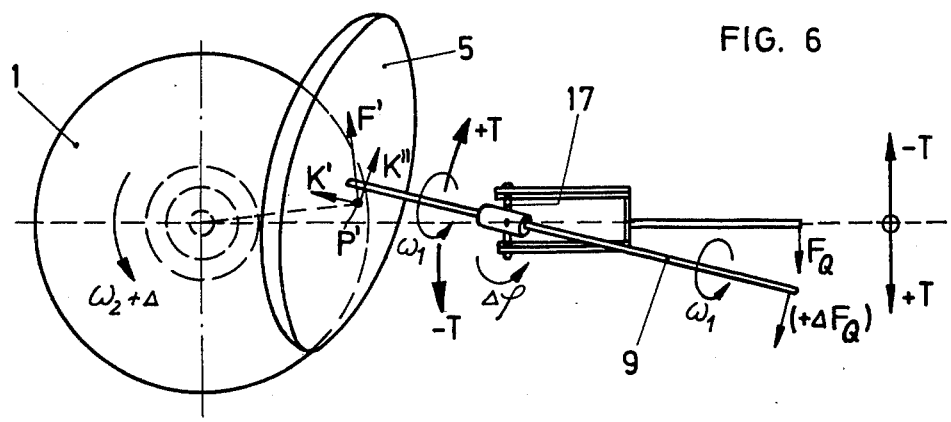

FIG. 6—A top view on the torque converter according to FIG. 2 in a transient behaviour e.g. the loading moment suddenly diminishing.

Figure 7:
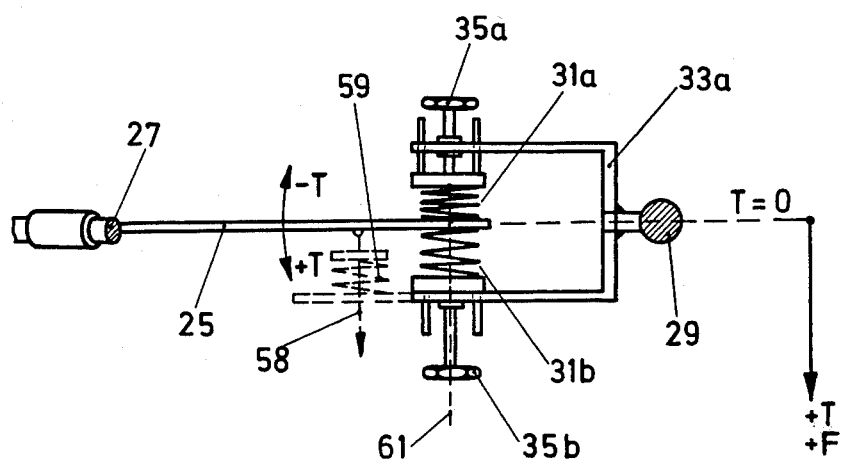

FIG. 7—The top view on a linear spring arrangement to act as feeding force on the force regulator.

Figure 8:
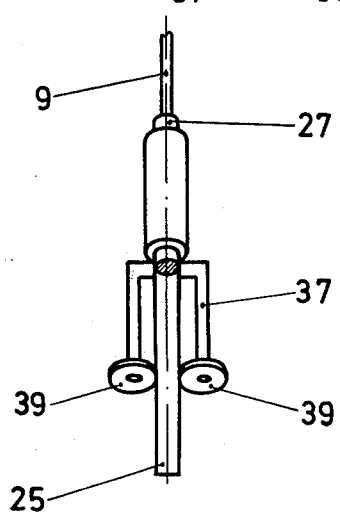

FIG. 8—A top view on the force regulator and its connection to an axis of one of the friction wheels.

Figure 9:
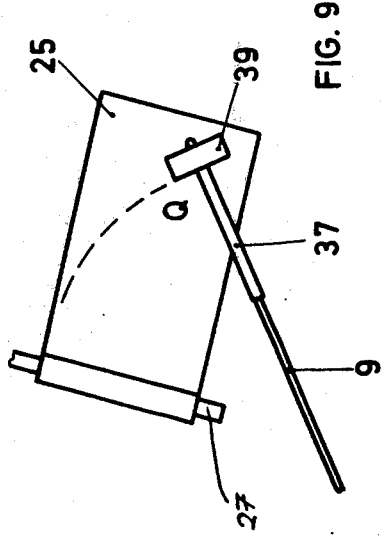

FIG. 9—A side view of the parts as shown in FIG. 8.

Figure 10:
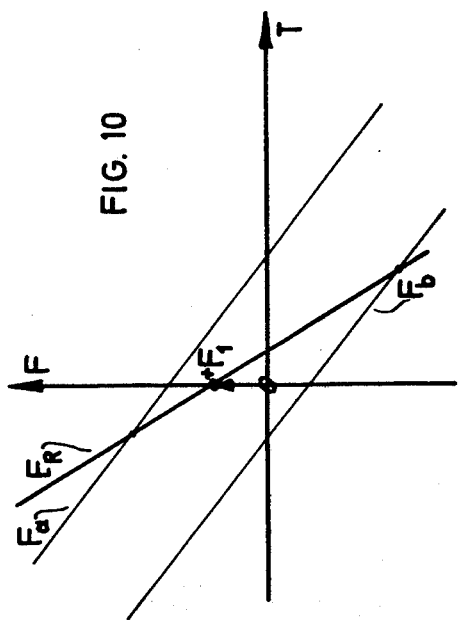

FIG. 10—A qualitative characteristic of two springs as shown in FIG. 7 and the resulting force characteristic.

Figure 11:
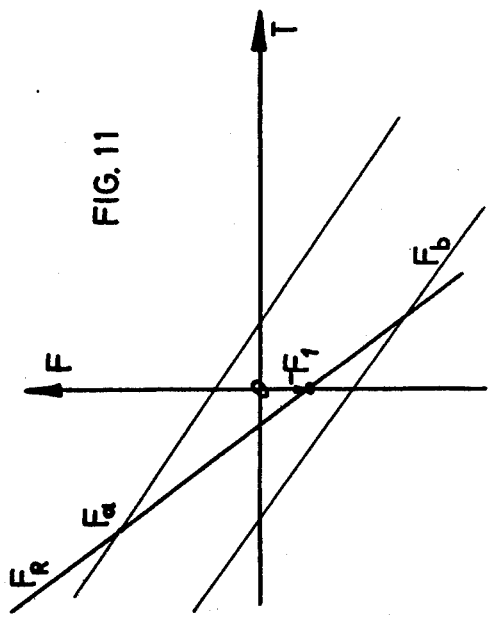

FIG. 11—The characteristic of the springs as shown in FIG. 10 after having been unspanned for inversion of the torque converter's driving direction.

Figure 12:
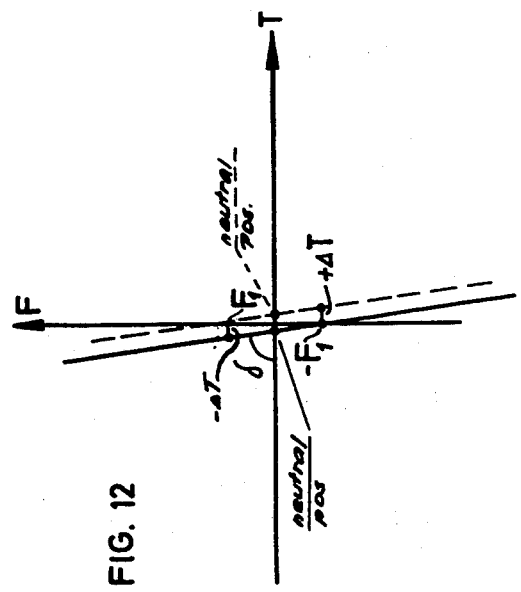

FIG. 12—The qualitative resulting force characteristic of springs according to FIG. 7 being pre-spanned so as to ensure the torque converter being drawn towards lowest step down ratio when a driving motor being stopped, as best restart position.

Figure 13:
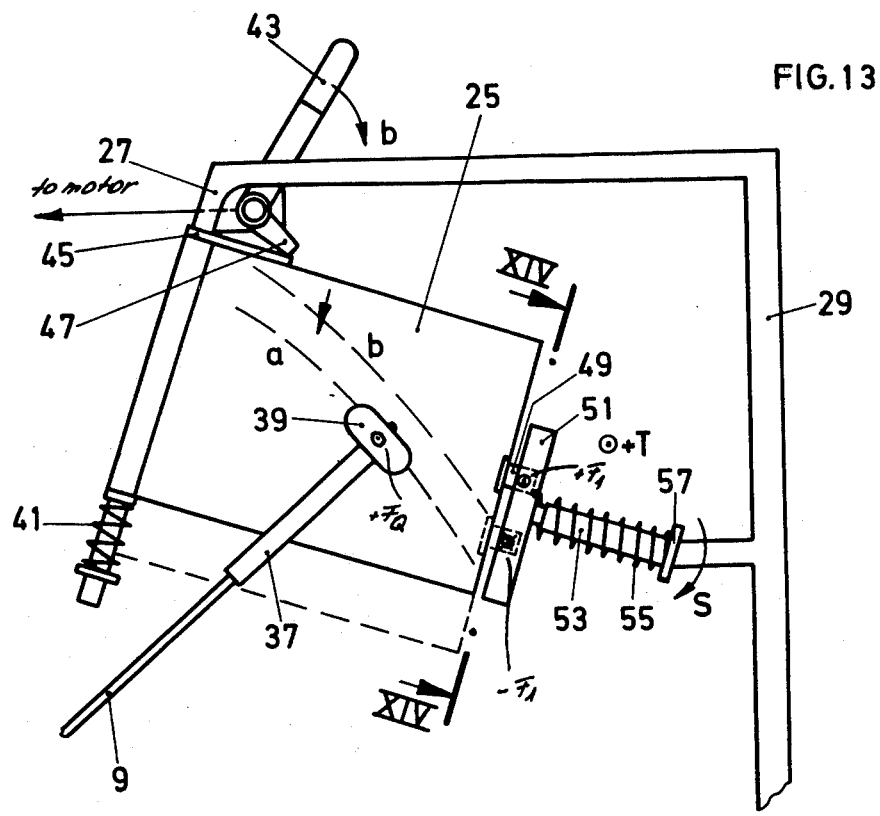

FIG. 13—The side view of the force regulator coupled to a torsion spring and provided with an option for inverting drive direction.

Figure 14:
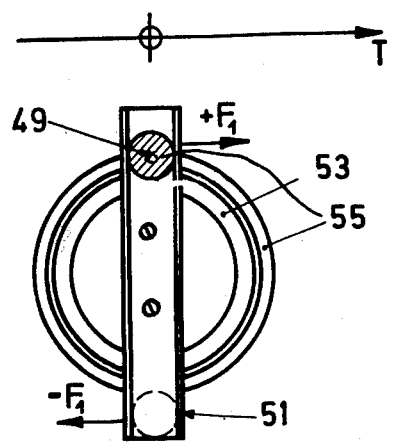

FIG. 14—A section according to lines XIV—XIV of FIG. 13 through the coupling of the force regulator to the torsion spring.

Figure 15:
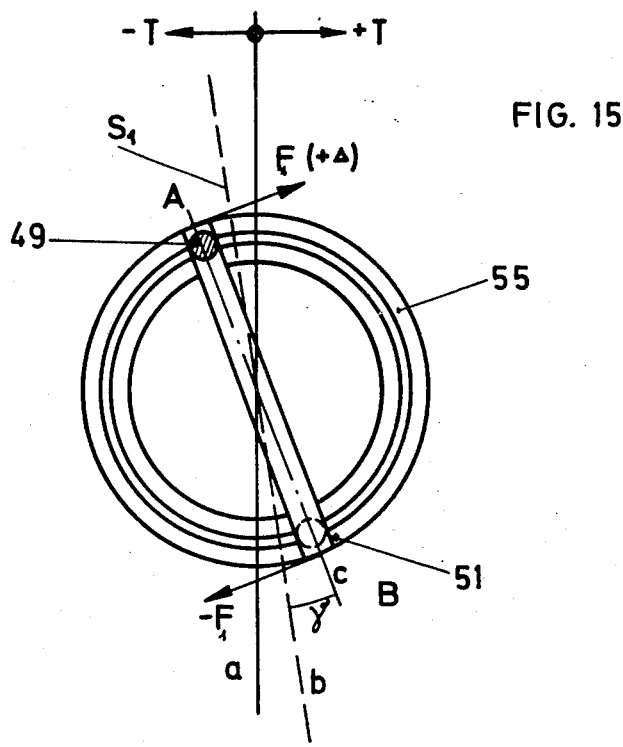

FIG. 15—A representation in analogy to FIG. 14 to show the relative positions of spring neutral axis, geometric neutral axis of the regulator, instantaneous position of the twistable end portion of the spring.

Figure 16:
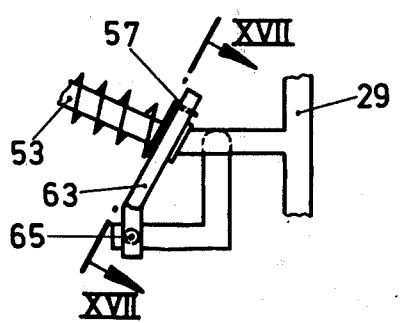

FIG. 16—The side view of an accelerator lever applied to the torsion spring.

Figure 17:
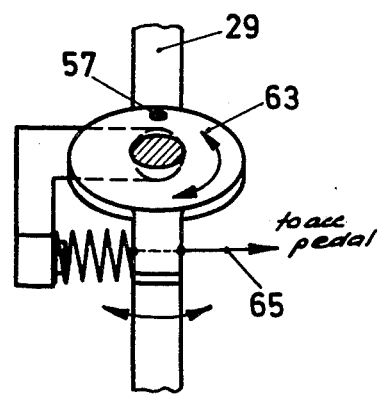

FIG. 17—A section view according to line XVII—XVII of FIG. 16.

Figure 18:
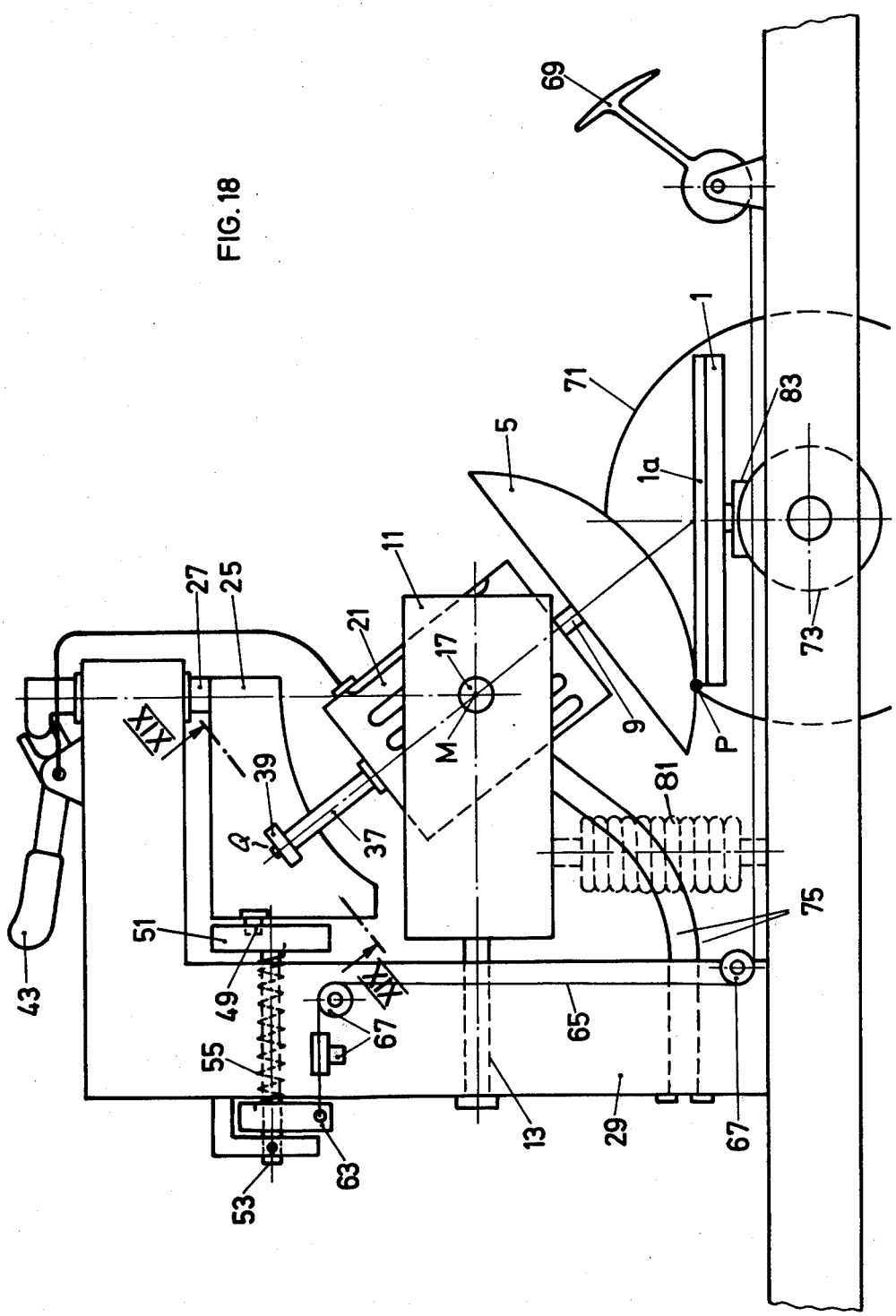

FIG. 18—A specific construction embodiment of the torque converter according to the knowledge explained to this point.

FIG. 19—A cross section according to line XIX—XIX of FIG. 18.

FIG. 20—A perspective drawing of the force regulator with two pairs of recess/bulge-surfaces to prevent the torque converter running and staying in the extreme step down ratio positions at both driving directions.

FIG. 21—A cross section according to line XXI—XXI of FIG. 20.

FIG. 22—A cross section according to FIG. 21 with exchangeable recess/bulge-surfaces, mountable at different positions on the force regulator.

The functioning of the inventive torque converter shall first be explained step by step, thereafter a construction example shall be given.

According to FIGS. 1 and 2 a first disc shaped friction wheel 1 is turnably mounted to a chassis 3 of a vehicle or a machine to be driven by the torque converter. A second friction wheel 5 with a ruled surface 7 formed by a spherical calotte is mounted on rotational axis 9 which latter is cardanically suspended. The cardanic suspension is formed by a U-shaped fork 11 which is pivotably mounted by an axis 13 to a bearing 15 rigidly fixed to the cahssis 3. At the ends of the fork 11 a further axis 17 is mounted which pivotably carries a bearing 19 for the rotational axis 9 of the ruled surface friction wheel 5.

As shown in FIG. 2 the rotational axis 9 lies within a plane E which is perpendicular with respect to the disc shaped friction wheel 1 and passes through its mid-point P. This is at least approximately the position of the converter in stationary running condition, i.e. with a driving and/or loading moment not varying in time. As an example the ruled surface friction wheel 5 is driven by a motor 21 which is connected by a flexible transmission 23 to a gear 25'. By rotation of axis 9 driven by gear 25' the ruled surface friction wheel 5 drives the disc-shaped friction wheel 1 which latter drives (not shown) e.g. through a differential the wheels of a car or any other suitable load. The mid-point of the friction wheel's 5 ruled surface calotte is cardanically suspended at point M. According to the driving direction of the motor 21 the rotational axis 9 and with it ruled surface friction wheel 5 is rotated with the angular velocity $\omega_1$. Accordingly, the disc shaped friction wheel 1 is driven with the angular velocity $\omega_2$. The power transmission from the ruled surface friction wheel 5 to the disc shaped friction wheel 1 occurs at a contacting point P where both friction wheels contact each other. Due to the power transmission at point P a force F acts at least nearly circumferentially on friction wheel 5, thus vertically to rotational axis 9 at the point S of said axis 9, positioned at the nearest distance from contacting point P. This distance $r_1$ will be called the friction radius of wheel 5. This force F causes a momentum with respect to tilting axis 13

$$M_{13} = F \cdot d$$

Hereby d is the projection of $\overline{SM}$ on a plane $E_2$ vertical to tilting axis 13. With respect to the cardanic suspension at point M on the opposite side of ruled surface friction wheel 5 a counteracting momentum $M_{13}$ has to be applied. This is performed by applying a force $F_o$ at a point Q of rotational axis 9 so that $F \cdot d = F_o \cdot D$, whereby D stands for the projection of the segment $\overline{MQ}$ of rotational axis 9 on the plane $E_2$, vertical to tilting axis 13.

At point P the circumferential speed of ruled surface friction wheel 5 as well as of disc shaped friction wheel 1 have to be the same for ideal rolling so that $$\omega_1 \cdot r_1 = \omega_2 \cdot r_2$$

$F \cdot r_2$ is the moment transmitted to the disc shaped friction wheel 1 and thus therefrom to a subsequent system to be driven by the converter. This momentum thus equals the loading momentum applied to friction wheel 1 in stationary running condition. If this momentum changes, the force F at point P will have to change for stationary conditions as the radius $r_2$ remains constant. As the motor 21 drives the rotational axis 9 with a constant moment $M_o$ a stationary running condition will be reached with a changed moment of load when $$\frac{M_o}{r_1} = F = \frac{M_L}{r_2}$$

Here $M_L$ stands for the moment of load which is e.g. introduced by the required moment to move the driven vehicle on. As the cardanic suspension at M is the midpoint of the ruled surface 7 of friction wheel 5 the radius $r_1$ as the shortest distance from rotational axis 9 to the contacting point P can be varied by tilting the rotational axis 9 more or less around tilting axis 17 as is shown in dashed lines of FIG. 1 at a for a greater radius $r_1$. As $$d = \overline{SM} \cos \phi$$

and $$D = \overline{MQ} \cos \phi$$

where $\phi$ is the tilting angle around axis 17 of rotational axis 9 as indicated in FIG. 1 the moment arms of the forces at Q and S alter identically when rotational axis 9 is tilted around axis 17. As $$F = (M_o/r_1)$$

and $$M_L = F \cdot r_2 = (M_o/r_1) \cdot r_2$$

$r_1$ must rise for diminishing force F and thus diminishing loading moment $M_L$ and diminishes for rising $M_L$. The converter will alter its step-down ratio $r_1/r_2$ as mentioned. To maintain the condition for stationary running the force $F_o$ must therefore diminish when $\phi$ becomes greater e.g. when $r_1$ becomes greater and thus when F as well diminishes with a given moment of the motor 21. Thus it has been recognized that for stationary running conditions at different ratios of driving and loading moment a force $F_o$ should be applied at a fixed position of the rotational axis 9 as in Q, whereby it has to be made sure that the force $F_o$ alters in amount as does the force F which is necessary to transmit to the disc shaped friction wheel 1 the necessary driving moment just to overcome the moment of loading. The force F which is transmitted to the disc shaped friction wheel 1 in dependency of radius $r_1$ from FIG. 1 is given by the expression $$F = \frac{M_o}{r_o \cdot \sin(\phi - \phi_o)}$$

Thereby, $r_o$ is the radius of the spherical calotte forming surface 7, $M_o$ is as previously mentioned the constant moment transferred from the motor 21 to the rotational axis 9, $\phi_o$ is the angle of the line MP with respect to the vertical plane $E_2$.

Thus, it has to be provided a force $F_o$ the amount of which varying with $\phi$ as does the force F.

This is achieved by a force regulator as will be discussed with reference to FIGS. 3 and 4. These 2 figures show an enlarged part of the drawing of FIG. 1 whereby the power transmission with motor 21, flexible transmission 23 and gear 25' as well as the rules surface friction wheel 5 have been omitted for clearness' sake. As force regulator a flag 25 is pivotably mounted on a pivot axis 27 which latter is rigidly fixed to chassis 3 e.g. by a frame work 29. A force $F_1$ is applied as shown in FIG. 3 and 4 to the flag 25 which acts as force regulator. The end Q of the rotational axis 9 slides when tilted around tilting axis 17 on a circular path p along the flag 25. If $F_Q$ stands for the force transmitted from the flag 25 on to the end of the rotational axis 9 at Q and o stands for the distance from the force $F_1$ to the flag pivot-axis 27, whereas x stands for the distance of the force $F_Q$ e.g. at Q from the above mentioned axis, $F_Q$ is given by the expression $$F_Q = \frac{F_1 \cdot o}{x}$$

and thus $$F_Q = \frac{F_1 \cdot o}{\overline{MQ} \sin(\phi - \alpha) - D_o}$$

Here, the angle $\alpha$ stands for the tilting angle of the flag's pivoting axis 27 with respect to vertical direction ($E_2$) as shown in FIG. 3, $D_o$ stands for the distance between the pivoting axis 27, its thought prolongation $27_a$, respectively, from the point M of the cardanic suspension of rotational axis 9.

A comparison of the expression for F according to FIG. 1 and $F_Q$ according to FIG. 3 which are now given by the expression $$F = \frac{M_o}{r_o \sin(\phi - \phi_o)} ; F_Q = \frac{F_1 \cdot o}{\overline{MQ} \sin(\phi - \alpha) - D_o}$$

reveals that these two forces will be identical and thus $F_Q = F_o$ as required if e.g.:

$$\frac{F_1 \cdot o}{\overline{MQ}} = \frac{M_o}{r_o}$$

$\alpha = \phi_o$ $D_o = 0$.

In FIG. 5 these construction conditions are fulfilled e.g. the tilting angle of the tilting axis 27 with respect to the vertical direction is the same as the angle of the line PM, $\phi_o$ and additionally the elongated pivoting axis $27_a$ crosses point M so that $D_o$ becomes zero.

The force $F_1$ is applied to the flag 25 e.g. by a spring 31 which lies at one end against flag 25 and is rigidly mounted on the other end to the frame 29 by a connecting part 33. Spring 31 is spanned to fulfill the above mentioned conditions, $$\frac{F_1 \cdot o}{\overline{MQ}} = \frac{M_o}{r_o}$$

at least approximately in the converter position according to FIGS. 1, 2 and 4. By the construction of the torque converter as principally shown in FIG. 5 in connection with the complete representation of FIGS. 1 and 2 it is achieved that the friction wheel 5 will keep stationary driving friction wheel 1 at all tilting angles $\phi$ e.g. at all radius $r_1$. With the constant driving moment of the motor 21, $M_o$, radius $r_1$ has to be varied in function of the loading moment $M_L$ which has to be overcome according to $$\frac{M_o}{M_L} = \frac{r_1}{r_2} \text{ with } r_2 = \text{constant}$$

If this relation is fulfilled by appropriate tilting of rotational axis 9 around tilting axis 17 of FIGS. 1 or 2 then the flag 25 as shown in FIG. 5 will provide the opposing moment required with respect to the cardanic suspension at M to enable stationary driving of friction wheel 1 with the required force F.

The next problem which has to be discussed is how the tilting angle $\phi$ will automatically be altered by an altering loading moment $M_L$ so that the torque converter according to FIG. 5 will automatically change its conversion ratio e.g. alter the radius $r_1$ according to the above mentioned equation $r_1 = f(M_L)$.

For explaining this functioning we will leave stationary conditions e.g. we are looking for what happens in the transient behaviour when the loading moment $M_L$ is altered in time. When the loading moment $M_L$ to be overcome as shown in FIG. 1 is reduced, this results in the fact that the angular speed $\omega_2$ of the disc shaped friction wheel 1 is momentarily enlarged as shown in FIG. 2 by the arrow $\omega_2 + \Delta$. As the friction wheel 5 does momentarily not alter neither the radius $r_1$ nor its angular speed $\omega_1$ momentarily the rolling conditions at point P will not any longer be exactly fulfilled. Resulting from this fact the ruled surface friction wheel 5 will be tilted in direction of arrow T in FIG. 2. As is appearent from FIG. 2 in stationary condition as shown, the force F in point P has only a component rectangularly to the tilting plane of rotational axis 9 with respect to tilting axis 17. As soon as the friction wheel 5 is tilted in direction of arrow T the disc shaped friction wheel 1 will act with a force F' on the friction wheel 5 in the new contacting point P' which force has now a component in the plane perpendicular to tilting axis 17 and through rotational axis 9, so that the friction wheel 5 will be tilted around axis 17 in a direction enlarging the radius $r_1$. This situation is shown in FIG. 6. In this figure which is based on FIG. 2, all elements unimportant for the understanding of the forces now acting on friction wheel 1, especially flag construction as shown in FIG. 5, motor and transmission as well as the mounting chassis are omitted. According to the direction of circumferential speed of disc shaped friction wheel 1 at point P' the new contacting point between friction wheel 1 and friction wheel 5, a component K' results from F' which will cause a moment with respect to tilting axis 17 thus enlarging $\phi$ according to FIG. 1 by an amount of $\Delta\phi$. Therefrom, a growing friction radius $r_1$ according to FIG. 1 results, the circumferential speed of friction wheel 1 at point P' grows as $\omega_1$ remains constant. With rising circumferential speed at point P' of friction wheel 5 the component K'' of force F' in a plane perpendicular to rotational axis 9 is reduced with result in first stopping the tilting movement in direction of arrow T of the rotational axis 9, which tilting is then reduced to approximately zero by enlargement of circumferential speed of wheel 5 at momentary contact point P as well as by action of spring 31 e.g. as shown in FIG. 5. Thus, friction wheel 5 will return towards the position shown in FIG. 2 with a tilting angle $\phi$ according to the required new radius $r_1$.

When loading moment $M_L$ is enlarged the radius $r_1$ will diminish analogically as described for diminishing $M_L$. Equilibrium is reached again with return towards position shown in FIG. 2 whereby the point Q of FIG. 5 goes e.g. in the new position Q''. When the momentum of load $M_L$ is reduced point Q of rotational axis 9 will travel e.g. to Q' in FIG. 5.

When tilting in $+T$ direction, as shown in FIG. 6, as the spring 31 is pre-spanned to act with a force $F_1$ in the direction indicated in FIG. 5, $F_1$ will diminish first to zero, but then will act against further tilting in $+T$ direction as the spring passes from push to pull action. Spring 31 acts against tilting in $-T$ direction because of its pre-spanned state. Thus, spring 31 ensures that the tilting movement $\pm T$ will remain very small in the transient behaviour, even when a large and sudden alteration of the loading moment $M_L$ occurs and will restore the stationary converter position. The torque converter as described until now will automatically alter its step-down ratio by altering $r_1$ when the moment of loading to be overcome is altered and will then stay again in stationary position approximately as shown in FIG. 2 because of the action of force conversion means, e.g. realized by flag 25 as shown in FIG. 5.

If now the loading moment $M_L$ is hold stationary and the end Q of rotational axis 9 is tilted by force e.g. by adding a force $+\Delta F_1$ additionally to a pre-selected force $F_1$ in FIG. 5, then the same situation as shown in FIG. 6 will occur, e.g. rotational axis 9 will be tilted as shown. The tilting by force of the rotational axis 9 in direction $+T$ in FIG. 6 will, as discussed before in the load changing case, result in an enlargement of the friction radius $r_1$ of friction wheel 5. This will result in a higher circumferential speed at the contacting point P' of friction wheel 5 and disc shaped friction wheel 1 which will result as the loading moment stays constant in an increase of the circular speed $\omega_2$ of friction wheel 1, as long as tilting $+T$ is maintained by force.

Analogically a tilting of the rotational axis 9 in direction of $-T$ will result, if the loading moment $M_L$ stays constant, in a reduction of the circular speed $\omega_2$. So the described torque converter not only automatically alters the step-down ratio according to the momentarily need given by the time behaviour of the moment load, but gives also the possibility to alter the transmitted speed by coupling e.g. a gas pedal to the rotational axis 9 to perform tilting movements of rotational axis 9 by force.

As has been seen from considerations in FIGS. 4 and 5 a stationary force $F_1$ has to be installed at the flag 25 which is performed by spring 31. The spring 31 acts in the stationary position of FIG. 2 with the force $F_1$ on the flag which is $$F_1 = \frac{M_o}{o} \text{ (if } r_o = \overline{MQ}\text{)}$$

If the driving direction of the motor 21 should be inversible it is clear that also the force $F_1$ acting on the flag 25 has to be inversed. If for this purpose two oppositely acting springs 31 could be provided they would have to be unspanned when inversing driving direction. In FIG. 7 the flag 25 according to FIG. 5 lies between two springs 31a and 31b whereas both springs are mounted within a fork 33a, latter being rigidly mounted to the frame 29. By means of setting screws 35a and 35b the force applied to the flag 25 in the tilting position $T=0$ e.g. the stationary position of FIG. 2 can be pre-setted. If the torque converter drives in a direction shown in FIG. 1, 2 or 6, the two springs 31a and 31b will be so pre-spanned that the resulting force on flag 25 $F_R$ is $F_1$ according force direction $+T$ in FIG. 6, if the torque converter drives the other way round the springs 31a and 31b will have to be unspanned so that the resulting force on flag 25, $F_R$ becomes $-F_1$. To allow interaction of flag 25 with rotational axis 9 for both driving directions the axis 9 comprises at its end a guiding fork, the flag 25 lying between the two fork ends. This construction is shown in FIG. 8 which is drawn in analogy to a view in direction V marked in FIG. 5. FIG. 9 shows the side view of the same arrangement. As can be seen, axis 9 terminates in the guiding fork 37 at both ends of which two guiding rolls 39 being turnably mounted. The force converting flag 25 lies between the two guiding rolls 39 so that it will be able to transmit the required force $\pm F_1$ in the direction required by the driving direction on the Q end of rotational axis 9.

In FIG. 10 a qualitative characteristic of the forces $F_a$ and $F_b$ acting from the springs 31a and 31b on the flag 25 in the arrangement of FIG. 7 is drawn and further the resulting force $F_R$ as supper-position of $F_a$ and $F_b$. Force and tilting angle directions are defined as shown in FIG. 6. If the driving direction of the converter is inverted unspanning of the springs 31a and 31b results in the qualitative characteristic of FIG. 11.

It might be advisable to ensure the zero i.e. neutral position of the springs being situated for the drive direction according to FIGS. 1, 2 and 6 at a small $-T$ angle to ensure that when stopping the motor, driving the rotational axis 9, the friction wheel 5 is drawn to the push down tilting side i.e. as mentioned to the $-T$ side where disc shaped friction wheel 1 pushes the ruled surface friction wheel 5 to smaller friction radius $r_1$. A qualitative characteristic of the appropriately spanned springs is shown in FIG. 12 for the shown driving direction, in dashed line for inverted driving direction. This characteristic can be achieved by appropriate chosing and spanning of the two springs 31a, 31b, respectively. As can be seen in this case stationary condition will not be reached at exactly $T=0$, but slightly on the $-T$ side or on the $+T$ side, respectively. As the spring characteristic ideally given by the angle $\delta$ of FIG. 12 can be chosen very steep, especially with good cardanic suspension without much friction, the deflection of the rotational axis 9 from the ideal zero T position in stationary condition by a very small angle of $\pm\Delta T$ will practically not spoil the friction behaviour of the torque converter but will ensure that the friction wheel 5 is drawn to that position with minimal friction radius $r_1$ when the driving motor 21 is stopped. This is then the optimum position for an accelerating force acting on the friction wheel 1 when the motor is started again.

A very simple handling of the spring arrangement for inverting driving direction is provided by using instead of linear springs as shown in FIG. 6, a torsion spring as will be described referring to FIGS. 13, 14, FIG. 14 being cross section view according to line XIV—XIV of FIG. 13. The flag 25 in FIG. 13 is again pivotably mounted on the axis 27. At the bottom end of this axis the flag 25 is spring loaded by a spring 41 which pushes the flag 25 against the upper end of the axis 27. A handle 43 is pivotably mounted on the upper end of frame 29 and will inter-act with a contacting piece 45 at flag 25 by a push-down arm 47. Thus, by pivoting the handle 43 in the direction indicated by the arrow b in FIG. 13 the flag 25 will be pushed down against the force of spring 41 and will be held down as long as handle 43 is in its self-holding pivoted down position. Guiding rolls 39 do thereby change their rolling path from dashed line a to dashed line b. At the opposite end of flag 25 with respect to axis 27 a bolt 49 is firmly fixed therein. This bolt slides in a U-bar 51 which latter is pivotably mounted on a shaft 53. The shaft 53 again is rigidly fixed to the frame 29. Shaft 53 carries a torsion spring 55 one end of it being fixed at position 57 whereas the other end being connected to the pivotably mounted U-bar 51. In FIG. 14 the forces acting on the bolt 49 either in upper or lower flag position are marked with $\pm F_1$ according to the tilting direction T as introduced in FIG. 6. Therefrom it is obvious that sliding down flag 25 will enable to reverse the driving direction of the torque converter without any unspanning of the spring 55 so that handle 43 can actually be referred at as direction inversion handle, especially when coupled to the driving motor to inverse its driving direction together with altering the flag's axial position. It should be obvious that the bolt 49 could also be slidable along the flag 25 and that instead of axially shifting the flag, the bolt alone could be shifted in high or low position. Another possibility is to fix bolt 49 at a bar in analogy to bar 51 and to provide flag 25 with a length side groove to make bolt 49 slidable in said groove when the flag 25 is moved up or down.

FIG. 15 shows in analogy to FIG. 14 how the spring 55 has to be pre-loaded to effect tilting the friction wheel 5 down to optimum starting position as previously described when the driving motor as 21 from FIG. 1 is stopped. Thereby, the axis a is the T=0 axis, the b axis is the neutral spring axis where no forces are exerted, and the position according to axis c is the U-bar 51 position to satisfy momentum conditions as previously described at stationary running conditions. Therefrom, it is clear that when stopping the motor 21 from FIG. 1 the U-bar 51 will be drawn into position b which is for both driving directions on that side of the zero T position (compare FIG. 6) which causes tilting down of the rotational axis 9 and thus diminishment of the friction radius $r_1$ as defined in FIG. 1. In the upper (A) flag position according to FIG. 13 i.e. in the status of driving the way round shown e.g. in FIG. 6 the U-bar 51 will, once the driving motor has stopped, remain at position S1 according to the neutral spring position. As this position is still on the −T side with respect to the geometrical neutral axis at T=0, the friction wheel 5 will stop tilted down so as to provide a minimum friction radius $r_1$. This occurs analogically when inversing driving direction i.e. pushing flag 25 to its down position in FIG. 13 and according to the down position for bolt 49 as shown in FIG. 15 at B.

Thus, with the use of a torsion spring instead of linear springs reversion of driving direction becomes very easy and can be accomplished with a single handling operation by just shifting flag 25 along its pivoting axis 27 which action unspans the torsion spring 55 to give the required force direction change for driving direction inversion and for satisfying positioning requirements of the friction wheel 5 in stop condition for ensuring optimal restarting. It goes without saying that the shown arrangements of either linear or torsion springs can be varied in many ways without departing from the here disclosed basic technique. A torsion spring e.g. can also be mounted as shown with dashed line at 57 in FIG. 5 at the pivoting axis 27 of the force converting flag 25.

As was previously described tilting the rotational axis 9 by force will result in accelerating or decelerating the drive speed. This can be achieved as shown in FIG. 7 in dashed lines by fixing to the force converting flag 25 an accelerator cable 58, leading through the fork 33a, whereby a spring 59 ensures return of flag 25 to its stationary position e.g. at T=0 shown in FIG. 7 when the accelerator pedal (not shown) being released. As will be appreciated actuation of accelerator cable 58 in FIG. 7 will tilt force converting flag 25 towards the +T side defined in FIG. 7 which will result in enlarging friction radius $r_1$ according to FIG. 1 and thus, provided loading moment being stationary, will result in an acceleration of the torque converter.

It is clear that accelerator cable 58 could also be acting on linear spring 31a of FIG. 7 e.g. as shown with dotted lines at position 61.

From this explanation it is clear that the accelerating cable will only act for acceleration when an appropriate driving direction is chosen. This inconvenience which will cause additional construction efforts when using linear springs is also avoided by the use of a torsion spring as was described in connection with FIG. 13 and especially FIGS. 14 and 15. As can be noticed acceleration will be enforced to the torque converter if a tilting angle in the same direction T is enforced to rotational axis 9 as shows the respective compensating force $\pm F_1$ applied to hold the converter in stationary running condition. Thus, an enlargement of $F_1$ lets say by an amount $+\Delta$ as shown in FIG. 15 will accelerate the driving speed in one driving direction. The enlargement of $F_1$ can be performed by enlarging the angle $\gamma$ between spring neutral axis b and $F_1$ providing axis c. Now it can be seen that enlarging of the angle $\gamma$ to provide a force $F_1+\Delta$ for one driving direction will cause the equal rise in force $-(F_1+\Delta)$ for the opposite driving direction i.e. when flag 25 and therewith bolt 49 is shifted from A position to B position in FIG. 15.

As enlarging angle $\gamma$ is equivalent to altering the spanning degree of the spring in position c of FIG. 15 this angle variation can be performed just by twisting the torsion spring's 54 end 57 as shown in FIG. 13 in spanning direction S more or less around the torsion spring's axis. Thus, if it is advisable to provide the torque converter e.g. according to FIG. 13 with the option of acceleration possibility with the same accelerator pedal in both driving directions, not to rigidly fix the torsion spring's end 57 to the frame 29, but to mount it as shown in FIG. 16 and 17 to an accelerator arm for the accelerator cable. According to FIGS. 16 and 17 this arm comprises a disc 63 which is turnably mounted on axis 53 which latter being rigidly fixed to the frame 29. FIG. 18 shows the torque converter constructed in analogy to the above detailed explanations. The friction wheel 5 is mounted to the axis 9 of an electro motor 21. In this construction the motor 21, preferably an electro motor, is mounted directly in a cardanic suspension so that the rotational axis 9 becomes cardanically suspended as well, as is self-evident. A strong fork 11 acts as suspension for the axis 17 which latter is rigidly mounted at the chassis of the motor 21. The fork 11 surrounding the motor 21 is pivotably mounted in the frame 29 by the axis 13. The fork 37 with the guiding rolls 39 in analogy to the explanations with respect to FIGS. 8 and 9 are slightly differently constructed as a result of the fact that in this embodiment the motor 21 is carried itself on the axis 9. The construction of fork 37 on the bottom of the motor 21 is shown in FIG. 19 which needs no further explanations. The contacting point P of the friction wheel 5 with fraction wheel 1 occurs vertically below the axis 17 or the mid-point M of the cardanic suspension. Therefore, it is obvious that the angle $\phi_o$ defined in FIG. 3 is zero, as well as $\alpha$, which is as viewed in FIG. 5, the same as $\phi_o$. Therefore, the pivoting axis 27 of the force converting flag 25 is mounted vertically above contacting point P i.e. in the elongated line $\overline{PM}$. The pivoting axis 27 of the force converting flag 25 is axially shiftable by means of a direction governing handle 43 coupled to the motor 21 in analogy to the explanations of FIG. 13. The force converting flag 25 acts with the bolt 49 into the U-shaped bar 51, latter being pivotably mounted on axis 53 within an appropriate boring in frame 29. On axis 53 rides a torsion spring 55 one end of which being rigidly fixed to pivotable U-bar 51, the other end of which being mounted to accelerator arm 63 in analogy to the detailed explanations of FIG. 16 and 17. An accelerator cable 65 leads over several guiding rolls 67 to an accelerator pedal 69 mounted on the frame 29 which can be handled like a gas pedal. The friction wheel 1 is provided at its friction side with a friction ring 1a of appropriately chosen material for assuring good friction with an according material of friction wheel 5. Friction wheel 1 acts on wheels 71 e.g. by means of a differential 73. Wheels 71 may be driving car wheels of an electromobil, being an electro motor with feeding connections 75. As sudden large changings of the loading moment will result in abrupt tilting +−T of rotational axis 9 and thus in abrupt enlarging or diminishing of the friction ratio $r_1$ of FIG. 1 to its minimal or maximal amount it may be advisable to provide guiding grooves in the force converting flag 25 as shown in FIGS. 19 and 20 to prevent occurrence of $r_1 = o$ or $r_1 = \max = r_{10}$ (FIG. 1). At both ends of the path of rolls 39 which is only marked by dashed line for clearness, but not constructively provided, an upleading and downleading guiding surface 77 and 79, respectively, are provided. For the two guide-roll-paths for upper and lower flag position according to the drive direction the up- and down-leading surfaces are inversely positioned. Thus, e.g. as shown in FIG. 20, the upleading surface 77 is provided at that end of the upper guiding roll path which is nearer to the pivoting axis 27 and inversely on the lower guiding roll path. As these guiding surfaces 77 and 79 will not only ensure that the friction wheel 5 will not swing into one of the extreme positions and will be drawn back towards stationary position, but will also limit the acceleration rate of the torque converter by means of tilting rotational axis 9 by force, it might be desireable to provide the possibility of limiting the acceleration rate to a desired amount depending on the specific application. Provision of the guiding surfaces 77 and 79 not make out of one piece with the force converting flag 25 can be seen in FIG. 22, where both surfaces are screwed to the flag 25 so that either different screwing locations or, as shown, different surface parts 77a, 77b or 79a, 79b respectively, can be mounted.

Switching back to FIG. 18 it might be advisable to provide shock-absorbing elements 81 e.g. acting between fork 11 and frame 29 as shown in dashed line, especially if the converter is subjected to high accelerations.

By the described invention a fast reacting torque converter on friction-wheel-base is proposed whose driving direction is inversible without making use of any control electronics. The proposed torque converter is quite simple in construction. If constructed as shown in FIG. 17 with the center of gravity of motor 21, friction wheel 5 and roll arrangement 39, 37 in the cardanic suspension point M, the torque converter can be mounted in any desired position. To assure a good friction contact at point P an automatic contact-pressure-regulator as is well known in the art will be provided at 83 of FIG. 18 pushing friction wheel 1 against friction wheel 5 with the higher force, the higher the required friction force is.

Although the invention has been described by examples of figures its scope should not be limited by the shown embodiments. Many variations of construction can be found departing from the shown constructions or techniques which should also fall within the scope of the invention and its inventive idea.

What I claim is:

1. A torque converter for automatically adjusting its step down ratio according to load variations, comprising; a first and a second friction wheel in contact with each other, the first wheel being a ruled surface wheel with axially varying radius, the rotational axis of both wheels being suspended so as to be tiltable relative to each other in two directions, a first direction in a plane formed by the two axes to alter the step down ratio by altering the friction radius of the first wheel, a second direction at least partly in direction of the circumferential speed of the wheels at their frictional area to bring said two axes out of in-plane alignment, force generating means acting on one of said two axes to prevent tilting in said second direction by the transmitted friction force, said force generating means being of spring characteristic and including a force converter to control the generated force in dependency of the tilting position in said first direction to thus meet the friction force at different step down ratios.

2. A torque converter according to claim 1 wherein the first frictional wheel is formed by a spherical calotte.

3. A torque converter according to claim 2 wherein the rotational axis of the first wheel is suspended in the center of curvature.

4. A torque converter according to claim 1 wherein the rotational axis of the first frictional wheel is suspended so as to perform the rolling as well as the tilting movement with respect to the second frictional wheel.

5. A torque converter according to claim 1 wherein the first axis is the axis of the first friction wheel.

6. A torque converter according to claim 5 wherein the first axis is coupled to the force regulation means at the end of the axis.

7. A torque converter according to claim 1 wherein the rotational axis of the first friction wheel is tiltingly suspended to a first suspension axis perpendicular to said rotational axis, and said first suspension axis being tiltingly suspended to a second suspension axis perpendicular to said first suspension axis.

8. A torque converter according to claim 1 wherein one of the rotational axis is cardanically suspended.

9. A torque converter according to claim 1 wherein the rotational axis of the first wheel is suspended in the center of curvature of an axial section through the first wheel.

10. A torque converter according to claim 1 wherein the second frictional wheel is disc-shaped.

11. A torque converter according to claim 9 wherein the frictional wheels contact each other at a peripheral region of the second friction wheel.

12. A torque converter according to claim 1 wherein the rotational axis of the first friction wheel is tiltable around two geometric axes.

13. A torque converter according to claim 11 wherein the two geometric axes are perpendicular to each other.

14. A torque converter according to claim 13 wherein the two geometric axes are perpendicular to each other and define one plane, the rotational axis of the first friction wheel crossing said two axes at one intersection point.

15. A torque converter according to claim 14 wherein the second friction wheel is disc-shaped and wherein said intersection point is set at least nearly perpendicularly above said friction area.

16. A torque converter according to claim 11 wherein the two geometric axes define a plane.

17. A torque converter according to claim 1 wherein the rotational axis of the first friction wheel is suspended in the center of gravity of the according friction-wheel/rotational axis-arrangement.

18. A torque converter according to claim 1 including a driving motor the axis of which is rigidly coupled with one of the rotational axis.

19. A torque converter according to claim 1 including a driving motor the axis of which is rigidly coupled to the first wheel's rotational axis.

20. A torque converter according to claim 19 wherein the rotational axis is suspended about the center of gravity of the frictional-wheel/axis/motor-arrangement.

21. A torque converter according to claim 1 wherein the force regulating means is a torque to force converter.

22. A torque converter according to claim 1 wherein the force regulating means comprises spring means.

23. A torque converter according to claim 1 wherein the force regulating means comprises an arm pivotably mounted to a pivot-axis.

24. A torque converter according to claim 23 wherein the first axis is slidably contacting said arm.

25. A torque converter according to claim 24 wherein said arm includes at least one recess and one bulge along with the sliding path of said first axis.

26. A torque converter according to claim 25 wherein said bulge and recess are variable with respect to their position on said arm.

27. A torque converter according to claim 23 wherein said arm is spring loaded in its pivoting direction.

28. A torque converter according to claim 27 wherein said arm is loaded by a torsion spring.

29. A torque converter according to claim 28 wherein said torsion spring is mounted with its torsion axis at least nearly in direction of said arm.

30. A torque converter according to claim 29 wherein said arm is coupled to one end of the torsion spring, said arm being shiftably mounted along its pivoting axis to alter the spanning of said spring.

31. A torque converter according to claim 30 wherein the arm is shiftable from a first into a second position and vice-versa, the spring being spanned to react on the arm in one direction in the first position and in the other direction in the second position.

32. A torque converter according to claim 30 wherein said arm is a pivotably mounted rigid flag, said end of the torsion spring acting via a bolt/groove sliding connection on said flag.

33. A torque converter according to claim 32 wherein said connection includes a bolt rigidly fixed at said flag, said end of the spring being fixed to pivotably fixed coupling means, and said bolt being slidably guided in a groove of said coupling means.

34. A torque converter according to claim 30 wherein the other end of the torsion spring is coupled to a spanning/unspanning device.

35. A torque converter according to claim 34 wherein said device includes a lever turnably mounted with respect to the torsion spring's axis, said other end of the torsion spring being rigidly mounted to this lever, this lever acting as accelerating lever for the torque converter.

36. A torque converter according to claim 27 wherein said arm is a pivotably mounted rigid flag, the first axis contacting slidably said flag at the end portion of the first axis.

37. A torque converter according to claim 36 wherein said end portion is bi-fork-ended, said flag lying between the fork ends.

38. A torque converter according to claim 37 wherein the ends of said fork are provided with a sliding roll.

39. A torque converter according to claim 27 wherein said arm is loaded at its free end with respect to its pivoting axis by spring means.

40. A torque converter according to claim 23 wherein the first axis is tiltably suspended along its length, the elongation of said pivot axis crossing the suspension of the first axis as well as said friction area.

41. A torque converter according to claim 40 wherein the arm is loaded by spring means, the spring means being in neutral position at a position of the arm warped with respect to a plane given by said elongation and the rotational axis of the second wheel.

42. A torque converter according to claim 23 wherein said pivot axis is parallel to the rotational axis of the second wheel.

43. A torque converter according to claim 21 wherein said arm is loaded by spring means, said spring means being in neutral position with said first axis intersecting the second wheel's axis warped.

44. A torque converter according to claim 27 wherein said arm contacts one end of spring means, the other end of the spring means being coupled to spanning means to alter the spring means' spanning.

45. A torque converter according to claim 23 wherein said arm is shiftable along its pivot-axis.

46. A torque converter according to claim 45 wherein said arm is slidable by means of a drive direction governing handle.

47. A torque converter comprising; a first and a second frictional wheel in contact with each other, the first of it being a ruled surface wheel with axially varying radius, wherein the rotational axis of both wheels are suspended so as to enable
a rolling movement of the first friction wheel on the second wheel in a plane containing its rotational axis to alter step down ratio between the wheels,
tilting movement of said axis relative to each other at least partly in direction of the circumferential speed of the wheels at its frictional area,
comprising force regulating means providing a force on a first of said wheel's axis, said force being regulated according to a varying friction force on said first axis' wheel to compensate for said friction force, said regulating means comprising force-generating means of spring characteristic to provide momentarily over-or under compensation of said friction force when altering in time, the force regulating means comprising an arm pivotably mounted to a pivot-axis, said arm being spring loaded in its pivoting direction, said arm being a pivotably mounted rigid flag, and the first axis contacting slidably said flag at said first axis' end portion.

48. A torque converter according to claim 47, said end portion being bi-fork-ended, said flag lying between the fork ends.

49. A torque converter according to claim 48, the ends of said fork being provided with a sliding roll.

50. A torque converter comprising a first and a second friction wheel in contact with each other, the first of it being a ruled surface wheel with axially varying radius, wherein the rotational axis of both wheels are suspended so as to enable
a rolling movement of the first friction wheel on the second wheel in a plane containing its rotational axis to alter step down ratio between the wheels,
a tilting movement of said axis relative to each other at least partly in direction of the circumferential speed of the wheels at its friction area,
comprising force regulating means providing a force on a first of said wheel's axis, said force being regulated according to a varying friction force on said first axis' wheel to compensate for said friction force, said regulating means comprising force-generating means of spring characteristic to provide momentarily over-or under compensation of said friction force when altering in time, the force regulating means comprising an arm pivotably mounted to a pivot-axis, said arm being spring loaded in its pivoting direction, said arm being loaded by a torsion spring, said torsion spring being mounted with its torsion axis at least nearly in direction of said arm, said arm being coupled to the torsion spring's one end, and said arm being shiftably mounted along its pivoting axis to alter the spanning of said spring.

51. A torque converter according to claim 50, the arm being shiftable from a first into a second position and vice-versa; the spring being spanned to react on the arm in one direction in the first position and the other direction in the second position.

52. A torque converter according to claim 50, said arm being a pivotably mounted rigid flag; said end of the torsion spring acting via a bolt/groove sliding connection on said flag.

53. A torque converter according to claim 52, said connection comprising a bolt rigidly fixed at said flag, said end of the spring being fixed to pivotably fixed coupling means, said bolt being slidably guided in a groove of said coupling means.

54. A torque converter comprising a first and a second friction wheel in contact with each other, the first of it being a ruled surface wheel with axially varying radius, wherein the rotational axis of both wheels are suspended so as to enable a rolling movement of the first friction wheel on the second wheel in a plane containing its rotational axis to alter step down ratio between the wheels, a tilting movement of said axis relative to each other at least partly in direction of the circumferential speed of the wheels at its friction area, comprising force regulating means providing a force on a first of said wheel's axis, said force being regulated according to a varying friction force on said first axis' wheel to compensate for said friction force, said regulating means comprising force-generating means of spring characteristic to provide momentarily over-or under compensation of said friction force when altering in time, the force regulating means comprising an arm pivotably mounted to a pivot-axis, said arm being spring loaded in its pivoting direction, said arm contacting one end of spring means, the other end of it being coupled to spanning means to alter the spring means' spanning.

55. A torque converter comprising a first and a second friction wheel in contact with each other, the first of it being a ruled surface wheel with axially varying radius, wherein the rotational axis of both wheels are suspended so as to enable a rolling movement of the first friction wheel on the second wheel in a plane containing its rotational axis to alter step down ratio between the wheels, a tilting movement of said axis relative to each other at least partly in direction of the circumferential speed of the wheels at its friction area, comprising force regulating means providing a force on a first of said wheel's axis, said force being regulated according to a varying friction force on said first axis' wheel to compensate for said friction force, said regulating means comprising force-generating means of spring characteristic to provide momentarily over-or under compensation of said friction force when altering in time, the force regulating means comprising an arm pivotably mounted to a pivot-axis, said arm being spring loaded in its pivoting direction, said arm being loaded by a torsion spring, said torsion spring being mounted with its torsion axis at least nearly in direction of said arm, said arm being coupled to the torsion spring's one end; said arm being shiftably mounted along its pivoting axis to alter the spanning of said spring, the other end of said torsion spring being coupled to a spanning/unspanning device.

56. A torque converter according to claim 55 said device comprising a lever turnably mounted with respect to the torsion spring's axis, said other end of the torsion spring being rigidly mounted to this lever, this lever acting as accelerating lever for the torque converter.

57. A torque converter comprising a first and a second friction wheel in contact with each other, the first of it being a ruled surface wheel with axially varying radius, wherein the rotational axis of both wheels are suspended so as to enable a rolling movement of the first friction wheel on the second wheel in a plane containing its rotational axis to alter step down ratio between the wheels, a tilting movement of said axis relative to each other at least partly in direction of the circumferential speed of the wheels at its friction area, comprising force regulating means providing a force on a first of said wheel's axis, said force being regulated according to a varying friction force on said first axis' wheel to compensate for said friction force, said regulating means comprising force-generating means of spring characteristic to provide momentarily over-or under compensation of said friction force when altering in time, the force regulating means comprising an arm pivotably mounted to a pivot-axis, said first axis slidably contacting said arm, said arm comprising at least one recess and one bulge along the sliding path of said first axis.

58. A torque converter according to claim 57, said bulge and recess being variable with respect to their position on said arm.

* * * * *